United States Patent [19]

Abo et al.

[11] 4,380,894

[45] Apr. 26, 1983

[54] FUEL SUPPLY CONTROL SYSTEM FOR A TURBINE ENGINE

[75] Inventors: Toshimi Abo, Yokohama; Hideo Iwatsu, Yokosuka, both of Japan

[73] Assignee: Nissan Motor Company, Limited, Yokohoma, Japan

[21] Appl. No.: 184,902

[22] Filed: Sep. 8, 1980

[30] Foreign Application Priority Data

Oct. 9, 1979 [JP] Japan .................................. 54-115969

[51] Int. Cl.³ .................................................. F02C 9/28
[52] U.S. Cl. ................................. 60/39.161; 60/39.281
[58] Field of Search .................... 60/39.16 R, 39.28 R

[56] References Cited

U.S. PATENT DOCUMENTS

| | | | |
|---|---|---|---|
| 3,764,814 | 10/1973 | Griffith | 60/39.16 R |
| 3,958,415 | 5/1976 | Lewis | 60/39.16 R |
| 3,963,372 | 6/1976 | McLain et al. | 60/39.16 R |
| 4,018,044 | 4/1977 | Joby et al. | 60/39.16 R |
| 4,040,250 | 8/1977 | Saunders et al. | 60/39.28 R |

Primary Examiner—Louis J. Casaregola
Attorney, Agent, or Firm—Lane, Aitken & Kananen

[57] ABSTRACT

A fuel supply control system is disclosed having a means for determining an engine load condition based on the revolution speed of a compressor shaft and a means for determining a target speed of a turbine output shaft. The latter means increases the target speed in a relatively low engine load condition to increase an inertia moment applied to the turbine output shaft and thereby to maintain the output shaft revolution speed within a given range, even when the load applied to the engine is rapidly increased.

7 Claims, 3 Drawing Figures

FUEL SUPPLY CONTROL SYSTEM FOR A TURBINE ENGINE

BACKGROUND OF THE INVENTION

The present invention relates generally to a fuel supply control system for a gas turbine engine for use with an electric power generator and the like, as the driving means thereof. More particularly, the invention relates to a fuel supply control system for a double-axle gas turbine engine having a compressor shaft and a turbine output shaft.

Generally, the double-axle gas turbine engine is used as a driving means for an alternator and so on. In the case of driving the alternator, the gas turbine engine is required to keep the revolution speed of the turbine output shaft constant in order to maintain the frequency of the output power of the alternator constant. For controlling the revolution speed of the turbine output shaft to a constant value, the fuel amount supplied to the gas turbine engine is controlled by controlling the period of opening of a fuel control valve provided in a main fuel passage which connects between a fuel tank and a fuel injection valve. In practice, the fuel control valve is provided with an electrically controlled actuator which is energized to open the valve to permit the fuel flowing to flow therethrough. The actuator of the fuel control valve is feedback controlled based on a difference between the actual revolution speed of the turbine output shaft and a target speed thereof. For feedback control of the actuator, there is provided a fuel control system in which a pulse width of a pulse signal to be applied to the actuator determines a ratio of an energized period and a deenergized period of the actuator, and is determined corresponding to the difference between the actual revolution speed and the target speed in order to reduce the difference therebetween to zero and to maintain the revolution speed of the turbine output shaft constant.

When a load is applied to the alternator and therefore a load applied to the turbine output shaft is rapidly increased, the revolution speed of the turbine output shaft is decreased. Therefore, the difference between the actual revolution speed and the target speed is increased. Responsive to this, the pulse width of the pulse signal to be applied to the fuel control valve is varied to increase the ratio of the energized period of the actuator to increase the fuel amount supplied to the gas turbine engine. However, the response of the fuel control valve lags with regard to variations of the pulse width of the pulse signal due to its mechanical delay of response. In this respect, the revolution speed of the turbine output shaft is temporarily lowered to lower the frequency of the output power of the alternator. Additionally, since the inertia moment applied to the double-axle gas turbine engine is smaller than that applied to a single-axle gas turbine engine, the ratio of lowering the revolution speed of the turbine output shaft of the double-axle gas turbine engine is relatively larger than that of the single-axle turbine engine.

In the conventional control system, the load applied to the turbine output shaft corresponding to the generator load, is measured. The control system determines the target revolution speed of the turbine output shaft based on the measured load condition of the turbine output shaft. In the low load condition, the target revolution speed of the turbine output shaft is determined at a relatively higher level within a range not exceeding an allowable range of revolution speed of the turbine output shaft. Thus, even when the load applied to the turbine output shaft is increased and thereby the revolution speed is lowered, the turbine output shaft can be maintained in the allowable range of the revolution speed.

However, for determining the revolution speed of the turbine output shaft, a relatively complicated and large or bulky device is necessary. Therefore, the total system of the turbine control system becomes complicated and large.

SUMMARY OF THE INVENTION

Therefore, it is an object of the present invention to provide a fuel supply control system for a gas turbine engine having an engine load sensing means which system is of simple construction, and which includes a means for increasing a target revolution speed of a turbine output shaft in a relatively low load condition in order to maintain the revolution speed of the turbine output shaft in a given range even when the engine load is rapidly increased.

According to the present invention, there is provided a fuel supply control system having a means for determining engine load condition based on the revolution speed of a compressor shaft and a means for determining a target speed of a turbine output shaft. The latter means increases the target speed in a relatively low engine load condition to increase the inertia moment applied to the turbine output shaft and thereby to maintain the output shaft revolution speed within a given range even when the load applied to the engine is rapidly increased.

BRIEF DESCRIPTION OF THE DRAWINGS

The present invention will become more fully understood from the detailed description and from the accompanying drawings of the preferred embodiment of the present invention, which, however, are not to be taken as limiting the invention, but rather are for elucidation and explanation only.

In the drawings.

DESCRIPTION OF THE PREFERRED EMBODIMENT

Figure 1:
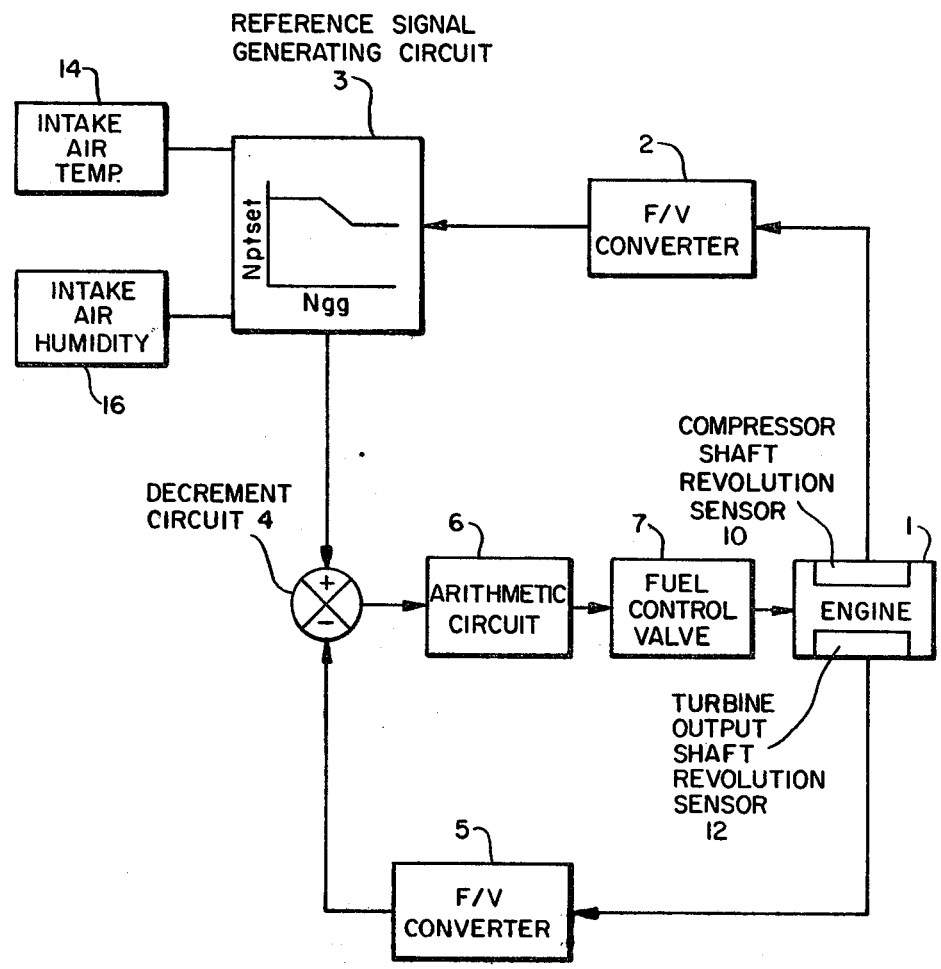
FIG. 1 is a schematic diagramatic view of a fuel control system for a gas turbine engine according to the present invention.
Figure 2:
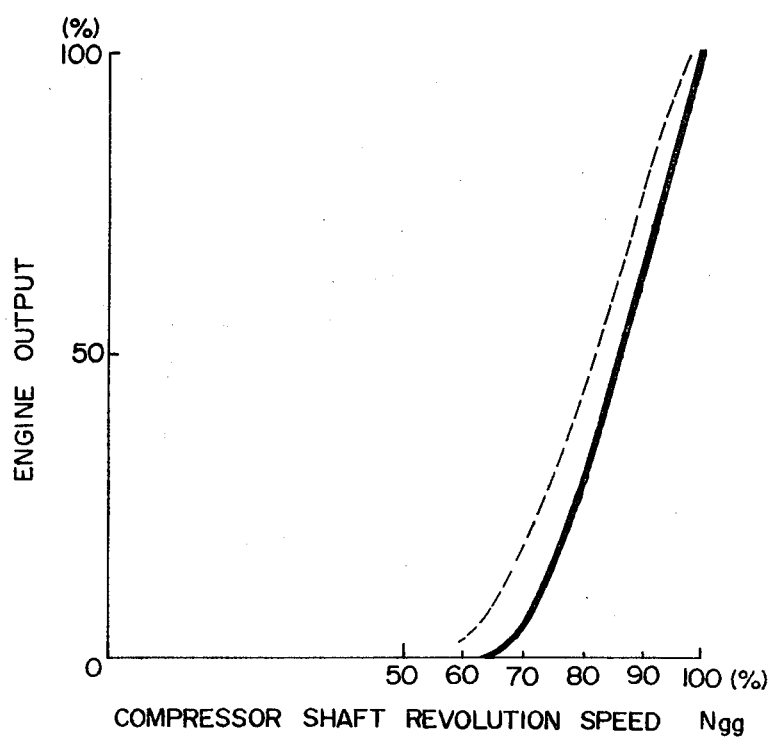
FIG. 2 is a graph showing a relationship between the revolution speed of the compressor shaft and the revolution speed of the turbine output shaft.

Referring now to the drawings, the reference numeral 1 denotes a gas turbine engine including a compressor shaft revolution sensor 10 for determining the revolution speed of a compressor shaft of a double-axle gas turbine engine. As shown in FIG. 2, the compressor shaft revolution speed Ngg is substantially proportional to the engine output power. Therefore, the engine load condition can be determined based on the measured compressor shaft revolution speed Ngg.

It is advantageous to use the compressor shaft revolution speed sensor 10 of the gas turbine engine for determining the compressor shaft revolution speed Ngg, since the structure for determining the gas turbine engine load condition can be simplified by using the compressor shaft revolution speed relative to that by using the turbine output shaft revolution speed. When the sensor 10 is provided for generating a sensor signal as a control parameter for another control system or for an indicator, it is more advantageous to use the sensor signal of the sensor 10 as a control parameter of the fuel supply control system.

The sensor 10 measures the compressor shaft revolution speed Ngg and generates a sensor signal corresponding to measured revolution speed. The sensor signal of the sensor 10 is fed to a frequency-to-voltage converter (hereafter referred as F/V converter) 2. The F/V converter 2 converts the sensor signal to an analog signal having a voltage corresponding to the measured compressor shaft revolution speed. As stated above, since the compressor shaft revolution speed is substantially proportional to the engine output power, the analog signal generated by the F/V converter 2 indirectly indicates the load condition of the engine.

Figure 3:
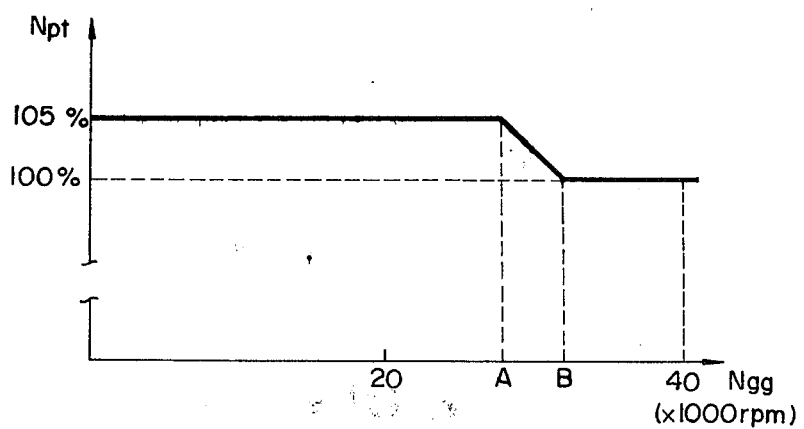
FIG. 3 is a graph showing a variation of the reference speed of the turbine output shaft.

The analog signal generated by the F/V converter 2 is fed to a reference signal generator 3. The reference signal generator 3 comprises either an analog circuit or a digital circuit, such as a microcomputer. In the reference signal generator 3, the engine load condition represented by the analog signal is detected. Based on the detected engine load, the reference signal generator 3 determines a coefficient for correcting a target revolution speed Nptset. Generally, the target revolution speed Nptset is the same as the rated speed of the turbine output shaft. As shown in FIG. 3, the target revolution speed Nptset is incremented at 5% of the maximum rated speed for the engine condition in which no engine load is applied. In FIG 3, the actual revolution speed Ngg of the compressor shaft in the engine idling condition is indicated at point A. Between a range between the point A and the point B which corresponds to 30% of the maximum rated speed of the compressor shaft revolution speed Ngg, the target speed Nptset is gradually decremented to the rated speed.

Corresponding to the determined target speed Nptset, the reference signal generator 3 generates a reference signal. At this time, it is preferable to correct the coefficient corresponding to the temperature and the humidity of the intake air, based on signals 14 and 16 representative thereof, since the relationship of the compressor shaft revolution speed and the turbine output shaft revolution speed is slightly varied depending on the intake air temperature and the humidity thereof.

The reference signal generated by the reference signal generator 3 is fed to a decrement circuit 4. To the decrement circuit 4, an analog signal generated by a F/V converting circuit 5 and indicative of the actual revolution speed Npt of the turbine output shaft. The decrement circuit determines the difference between the target speed Nptset and the actual revolution speed Npt and generates a signal indicative of the determined difference. The signal is fed to an arithmetic circuit 6. Corresponding to the difference between the target speed Nptset and actual revolution speed of the turbine shaft, the arithmetic circuit 6 determines the pulse width of a pulse signal indicative of a ratio of an energized period and a deenergized period of an actuator of a fuel control valve 7. The pulse signal is applied to the fuel control valve 7 to control the energized period thereof in order to reduce the difference between the target speed and the actual revolution speed of the turbine output shaft.

According to the present invention, since the target speed is increased in a relatively low engine load condition, and thereby the inertia moment applied to the turbine output shaft is increased, the revolution speed of the turbine output shaft is maintained within a given range even when the load applied to the engine is rapidly increased. Further, by indirectly determining the engine load by determining the revolution speed of the compressor shaft, the complicated and relatively larger device for determining the engine load is unnecessary at all and therefore the control system for the fuel supply of the gas turbine engine can be successfully and satisfactorily simplified.

Thus, the present invention fulfills all of the objects and advantages sought therein.

What is claimed is:

1. A fuel supply control system for a gas turbine engine comprising:
   a turbine output shaft;
   a compressor shaft;
   a fuel control valve varying the ratio of an energized period and a deenergized period depending on the engine operating condition;
   first means for generating a first signal indicative of said compressor shaft revolution speed;
   second means for determining a target turbine output shaft revolution speed based on said first signal value and generating a reference signal having a value indicative of said target turbine output shaft revolution speed, said second means increasing said target turbine output shaft revolution speed when said first signal value is below a predetermined value;
   third means for determining an actual turbine output shaft revolution speed and generating a second signal indicative of the determined actual turbine output shaft revolution speed; and
   fourth means for comparing said second signal value with said reference signal value in order to determine the difference between the actual turbine output shaft revolution speed and target speed and for determining a duty cycle of a pulse signal based on the determined difference to control the ratio of the energized period and the deenergized period of said fuel control valve to reduce the difference in order to drive the engine at a constant speed.

2. A control system as set forth in claim 1, wherein said second means corrects said determined reference signal value indicative of the target turbine output shaft revolution speed depending upon intake air temperature and humidity.

3. A control system as set forth in claim 1 or 2, wherein said target speed is increased at rate of 5% when the engine load is lower than a given level.

4. A fuel supply control system for a gas turbine engine having a compressor with a compressor shaft and a turbine with an output shaft to be driven by revolution of said turbine, which system comprises:
   a fuel control valve varying the ratio of an energized period and a deenergized period depending on the engine driving condition;
   a first sensor for detecting a revolution speed of said compressor shaft for producing a first signal having a value proportional to the compressor shaft revolution speed;
   a reference signal generator detecting a load condition on the engine based on said first signal value and determining a target turbine output shaft revolution speed based on the engine load, said reference signal generator producing a reference signal having a value proportional to said target turbine output shaft revolution speed;

a second sensor for detecting a turbine output shaft revolution speed to produce a second signal having a value proportional to the turbine shaft revolution speed;

arithmetic means for determining a difference between said reference signal value and said second signal value to determine a fuel supply amount based on said difference, said arithmetic means producing a pulse signal having a duty cycle representative of the fuel supply amount for controlling the ratio of the energized period and the deenergized period of said fuel control valve so that said turbine output shaft is controlled to said target speed.

5. The system as set forth in claim 4, wherein said reference signal generator determines said target turbine output shaft revolution speed at a first value when said engine load is lower than a given value and at a second constant value when the engine load condition is above said given value.

6. The system as set forth in either claim 4 or 5, wherein said reference signal generator corrects said reference signal value with a correction value determined based on an intake air temperature condition.

7. The system as set forth in either claim 4 or 5, wherein said reference signal generator corrects said reference signal value with a correction value determined based on the humidity of intake air.

* * * * *